United States Patent
Kim et al.

(10) Patent No.: US 8,564,670 B2
(45) Date of Patent: Oct. 22, 2013

(54) CAMERA CALIBRATION APPARATUS AND METHOD USING PARALLELOGRAMS IN IMAGE AND MULTI-VIEW CONTROL

(75) Inventors: Jae-Hean Kim, Yongin-si (KR); Bon-Ki Koo, Daejeon (KR)

(73) Assignee: Electronic and Telecommunications Research Institute, Daejeon (KR)

( * ) Notice: Subject to any disclaimer, the term of this patent is extended or adjusted under 35 U.S.C. 154(b) by 112 days.

(21) Appl. No.: 13/221,307

(22) Filed: Aug. 30, 2011

(65) Prior Publication Data

US 2012/0162441 A1 Jun. 28, 2012

(30) Foreign Application Priority Data

Dec. 22, 2010 (KR) .................. 10-2010-0132883

(51) Int. Cl.
H04N 5/217 (2011.01)
(52) U.S. Cl.
USPC ......................... 348/187; 348/180
(58) Field of Classification Search
USPC ......................................... 348/187
See application file for complete search history.

(56) References Cited

U.S. PATENT DOCUMENTS

| 6,437,823 | B1 | 8/2002 | Zhang |
| 2005/0207640 | A1 | 9/2005 | Kim et al. |
| 2006/0026646 | A1* | 2/2006 | Lou et al. ...................... 725/52 |
| 2006/0132868 | A1 | 6/2006 | Zhang |
| 2008/0007700 | A1* | 1/2008 | vanBaar et al. ............... 353/94 |
| 2009/0153669 | A1 | 6/2009 | Kim et al. |
| 2010/0111370 | A1* | 5/2010 | Black et al. .................... 382/111 |
| 2010/0158353 | A1* | 6/2010 | Kim et al. ..................... 382/154 |

FOREIGN PATENT DOCUMENTS

| KR | 1995-0012130 | 5/1995 |
| KR | 2002-0077685 | 10/2002 |
| KR | 10-2007-0101580 | 10/2007 |
| KR | 10-2009-0065198 | 6/2009 |

OTHER PUBLICATIONS

Roger Y. Tsai, "A Versatile Camera Calibration Technique for High-Accuracy 3D Machine Vision Metrology Using Off-the-Shelf TV Cameras and Lenses," IEEE Journal of Robotics and Automation, 1987.

Zhengyou Zhang et al., "A Flexible New Technique for Camera Calibration," IEEE Transactions on Pattern Analysis and Machine Intelligence, 2000.

Marc Pollefeys et al., "Stratified Self-Calibratin with the Modulus Constraint," IEEE Transactions on Pattern Analysis and Machine Intelligence, 1999.

(Continued)

*Primary Examiner* — Jefferey Harold
*Assistant Examiner* — Justin Sanders
(74) *Attorney, Agent, or Firm* — Staas & Halsey LLP (57) ABSTRACT

Disclosed herein is a camera calibration apparatus. The camera calibration apparatus includes an image reception unit and a camera calibration unit. The image reception unit receives images, in which a same background is captured, from respective cameras placed at locations which are different from each other. The camera calibration unit calculates an entire matrix using canonic topographies for all parallelograms located on respective surfaces which are different from each other within each of the images, and calculates infinite hymnographies between the cameras using the entire matrix at the same time.

7 Claims, 7 Drawing Sheets

(56) References Cited

OTHER PUBLICATIONS

Marc Pollefeys et al., Visual Modeling with a Hand-Held Camera, International Journal of Computer Vision, 2004.

David Liebowitz et al., "Combining Scene and Auto-Calibration Constraints," Int. Conf. on Computer Vision, 1999.

Jun-Sik Kim, et al., "Estimating Intrinsic Parameters of Cameras Using Two Arbitrary Rectangles," Int. Conf. on Pattern Recogniation, 2006.

Marta Wilczkowiak et al., "Using Geometric Constraints through Parallelepipeds for Calibration and 3D Modeling," IEEE Transactions on Pattern Analysis and Machine Intelligence, 2005.

* cited by examiner

CAMERA CALIBRATION APPARATUS AND METHOD USING PARALLELOGRAMS IN IMAGE AND MULTI-VIEW CONTROL

CROSS REFERENCE TO RELATED APPLICATION

This application claims the benefit of Korean Patent Application No. 10-2010-0132883, filed on Dec. 22, 2010, which is hereby incorporated by reference in its entirety into this application.

BACKGROUND OF THE INVENTION

1. Technical Field

The present invention relates generally to a camera calibration apparatus and method using parallelograms in each image and multi-view control, and, more particularly, to a camera calibration apparatus and method using parallelograms located on respective surfaces which are different from each other within each image.

2. Description of the Related Art

Generally, a camera calibration operation has been widely used in computer vision, robotics, the movie industry, and human-computer interaction, in which 3D information is generated using cameras.

An example of such a camera calibration method is to perform camera calibration using a specifically manufactured camera frame. As described above, when a calibration frame is used, the relative position of a specific marker can be previously and accurately known, so that accurate results can be obtained. However, there is the inconvenience of always having to carry a heavy and large calibration frame.

As another example, various continuous images are captured, so that the images themselves are used to perform camera calibration. Like this, a method of calibrating images based on projective geometric restoration is called automatic calibration, and can be used on the assumption that the parts of camera internal variables are known. Calibration can be performed even though there is no geometric information about a specific calibration frame or background. However, there is a problem in that a large amount of images are required for accuracy.

As another further example, camera calibration is performed using geometric information existing on images. Here, the geometric information existing on images may include a set of parallel lines at a vertical direction, spheres, and circles. When such geometric information is used, camera calibration can be performed without using a specific calibration frame and a plurality of images. However, there is a problem in that camera calibration cannot be performed when geometric information, such as a set of parallel lines at a vertical direction, spheres and circles, does not exist.

In order to solve such a problem, there is a camera calibration method using parallelograms which frequently appear on artificial structures. However, there is a problem of decreasing accuracy because infinite topographies for each pair of cameras should be calculated separately.

SUMMARY OF THE INVENTION

Accordingly, the present invention has been made keeping in mind the above problems occurring in the prior art, and an object of the present invention is to provide a camera calibration apparatus and method for performing camera calibration using parallelograms located on respective surfaces which are different from each other within each image.

In order to accomplish the above object, a camera calibration apparatus according to an embodiment of the present invention includes: an image reception unit for receiving images, in which a same background is captured, from respective cameras placed at locations which are different from each other; and a camera calibration unit for calculating an entire matrix using canonic homographies for all parallelograms located on respective surfaces which are different from each other within each of the images, and calculating infinite homographies between the cameras using the entire matrix at a same time.

The camera calibration unit includes a homography generation unit for detecting the vertexes of at least two parallelograms projected onto the object of each of the images, and calculating the canonic homographies.

The homography generation unit calculates the canonic homographies in such a way that the vertexes of the at least two parallelograms of each of the images correspond to the vertexes of a canonic square.

The camera calibration unit includes a matrix generation unit for calculating a relative homography in such a ways as to combine the canonic homographies, and for calculating the entire matrix using the eigenvalue of the relative homography and the canonic homographies.

The matrix generation unit calculates size adjustment parameters for the respective canonic homographies using the eigenvalue of the relative homography, and calculates sub matrixes in such a way to multiply each of the size adjustment parameters by each of the corresponding canonic homographies.

The matrix generation unit calculates the entire matrix using the size adjustment parameter corresponding to each of the sub matrixes.

The camera calibration unit includes an internal variable generation unit for detecting decomposition matrixes corresponding to the number of the cameras from among resulting matrixes in which Singular Value Decomposition (SVD) is performed on the entire matrix, and for calculating the infinite homographies at the same time using the decomposition matrixes.

The internal variable generation unit performs camera calibration using the infinite homographies.

The camera calibration unit restores the structure of an object onto which the parallelograms are projected and the locations of the cameras using the results of camera calibration.

In order to accomplish the above object, a camera calibration method according to another embodiment of the present invention includes receiving images, in which a same background is captured, from respective cameras placed at locations which are different from each other; calculating canonic homographies for all parallelograms located on respective surfaces which are different from each other within each of the images; calculating an entire matrix using the canonic homographies; and calculating infinite homographies between the cameras using the entire matrix.

The calculating the canonic homographies includes: detecting the vertexes of at least two parallelograms projected onto the object of each of the images; and calculating the canonic homographies in such a way that the vertexes of the at least two parallelograms of the image correspond to the vertexes of a canonic square.

The calculating the entire matrix includes: calculating a relative homography in such a way as to combine the canonic homographies; calculating size adjustment parameters for the respective canonic homographies using the eigenvalue of the relative homography; calculating sub matrixes in such a way to multiply each of the size adjustment parameters by each of the corresponding canonic homographies; and calculating the entire matrix using the sub matrixes and the size adjustment parameters.

The calculating the infinite homographies at the same time includes: detecting decomposition matrixes corresponding to the number of the cameras from among resulting matrixes in which Singular Value Decomposition (SVD) is performed on the entire matrix; and calculating the infinite homographies at the same time using the decomposition matrixes.

The calculating the infinite homographies at the same time includes: performing camera calibration using the infinite homographies; and restoring the structure of an object onto which the parallelograms are projected and the locations of the cameras using the results of camera calibration.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
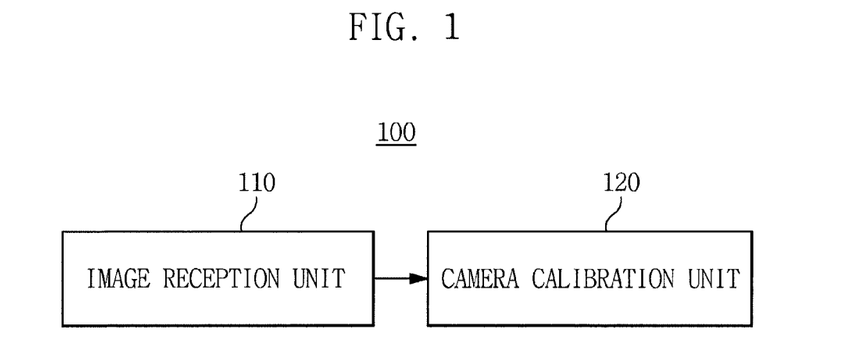
FIG. 1 is a view schematically illustrating a camera calibration apparatus according to an embodiment of the present invention.
Figure 2:
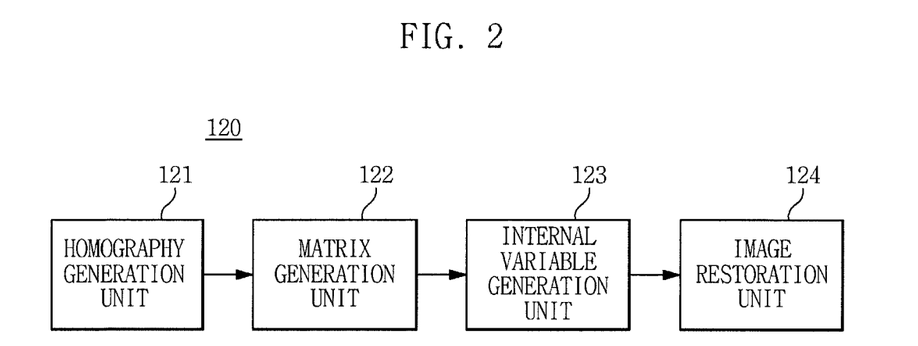
FIG. 2 is a view schematically illustrating the camera calibration unit of the camera calibration apparatus shown in FIG. 1.
Figure 3:
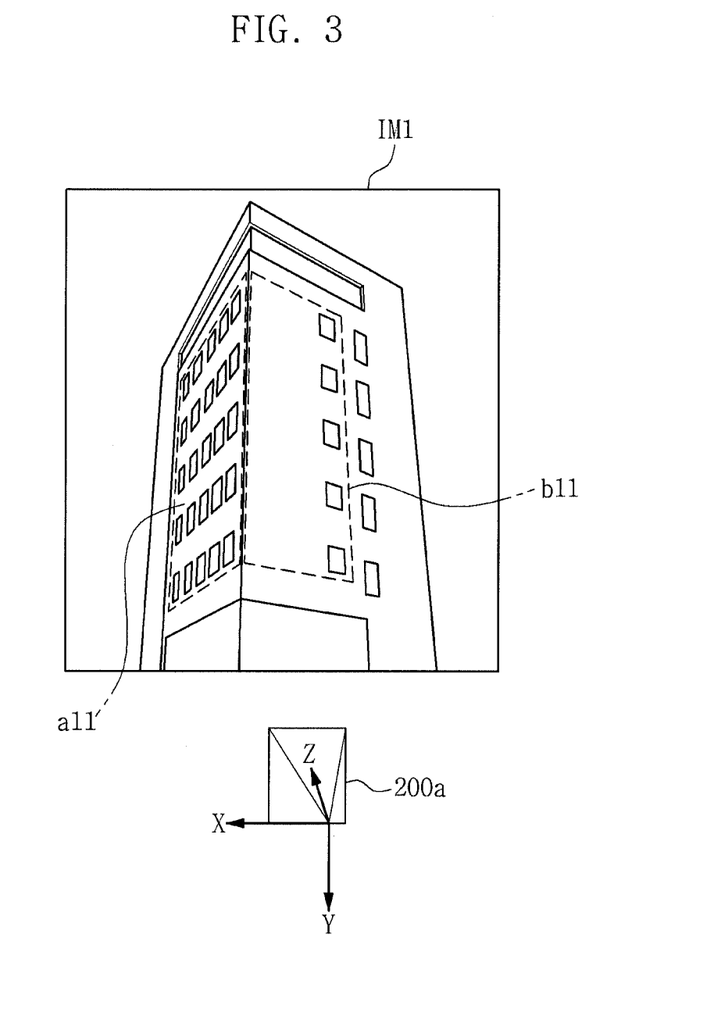
FIGS. 3 to 5 are views illustrating images captured by cameras placed at locations which are different from each other.
Figure 4:
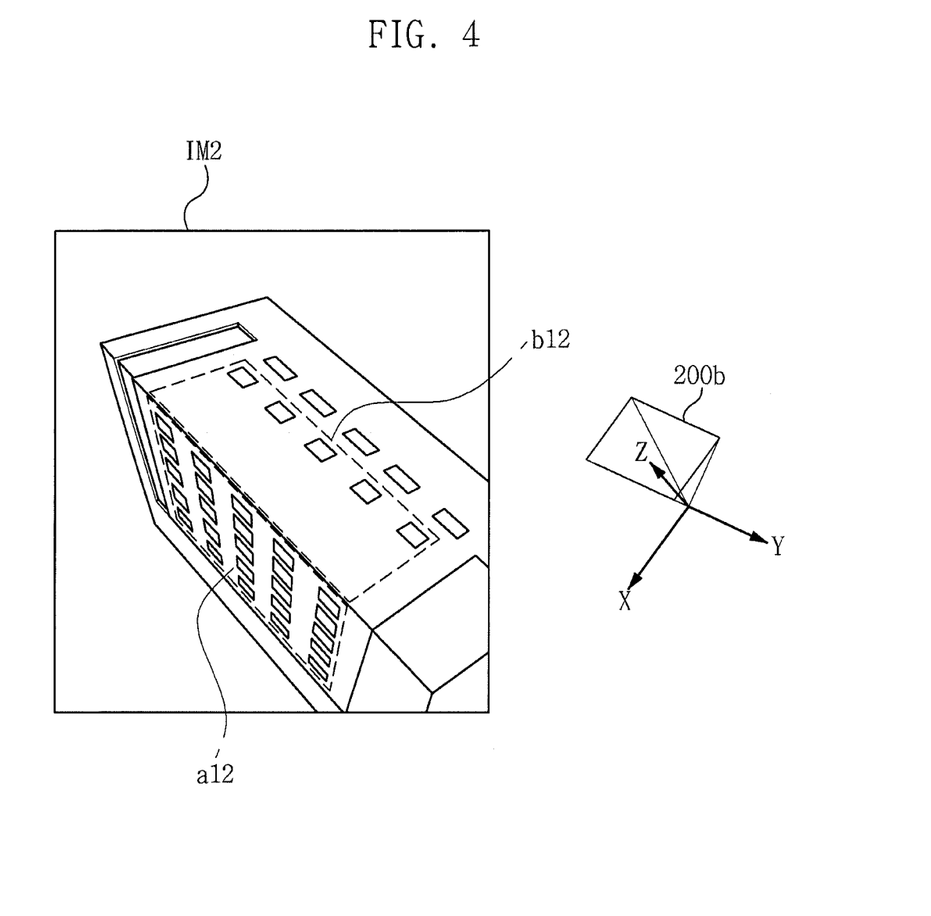
Figure 5:
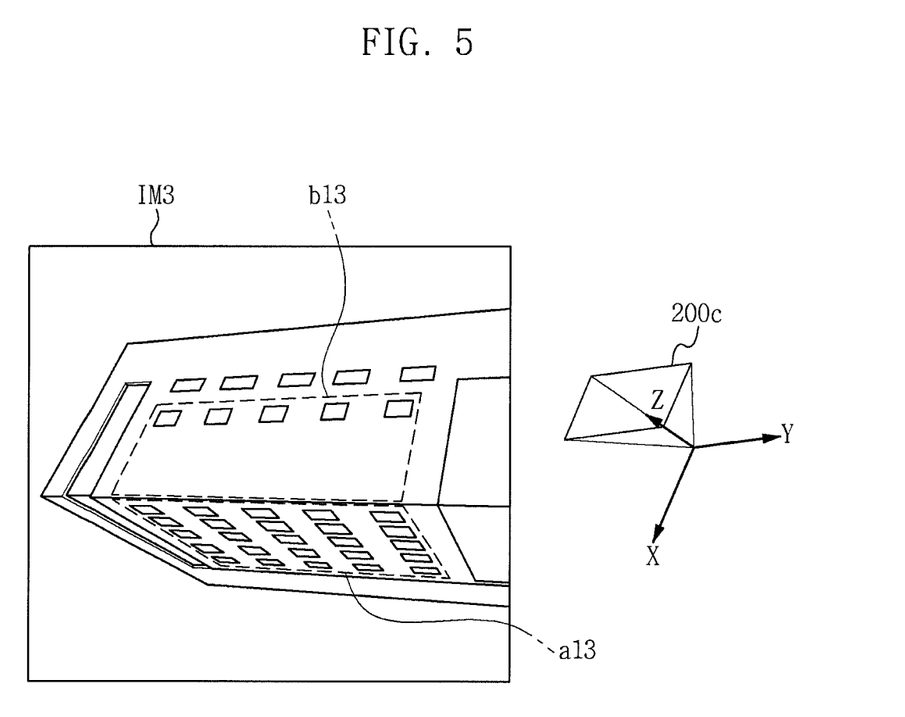
Figure 6:
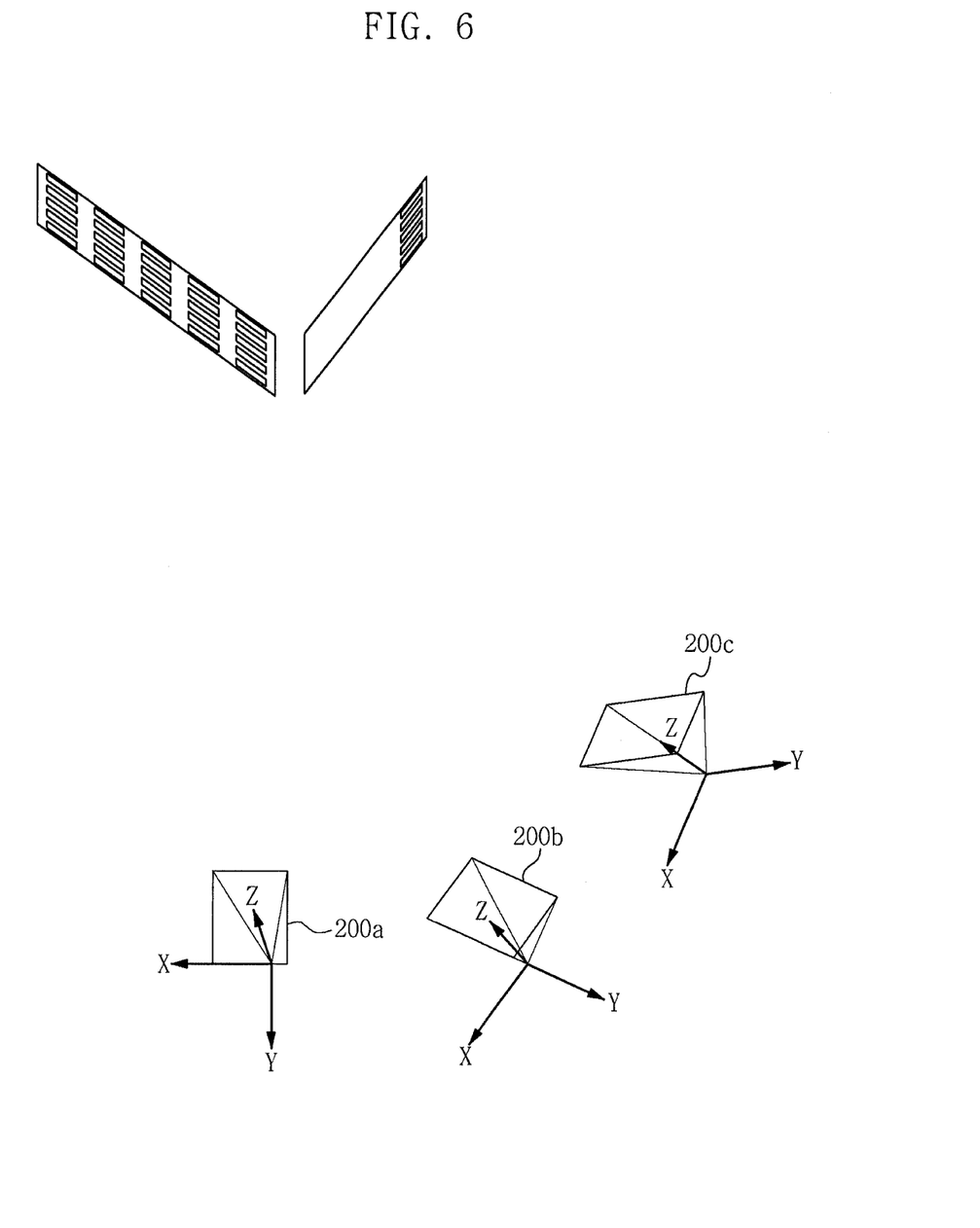
FIG. 6 is a view illustrating an example in which camera calibration is performed by calculating internal variables using the camera calibration apparatus shown in FIG. 1 so that the locations of the cameras and a building are restored using a camera calibration result, the example corresponding to a result viewed from above.
Figure 7:
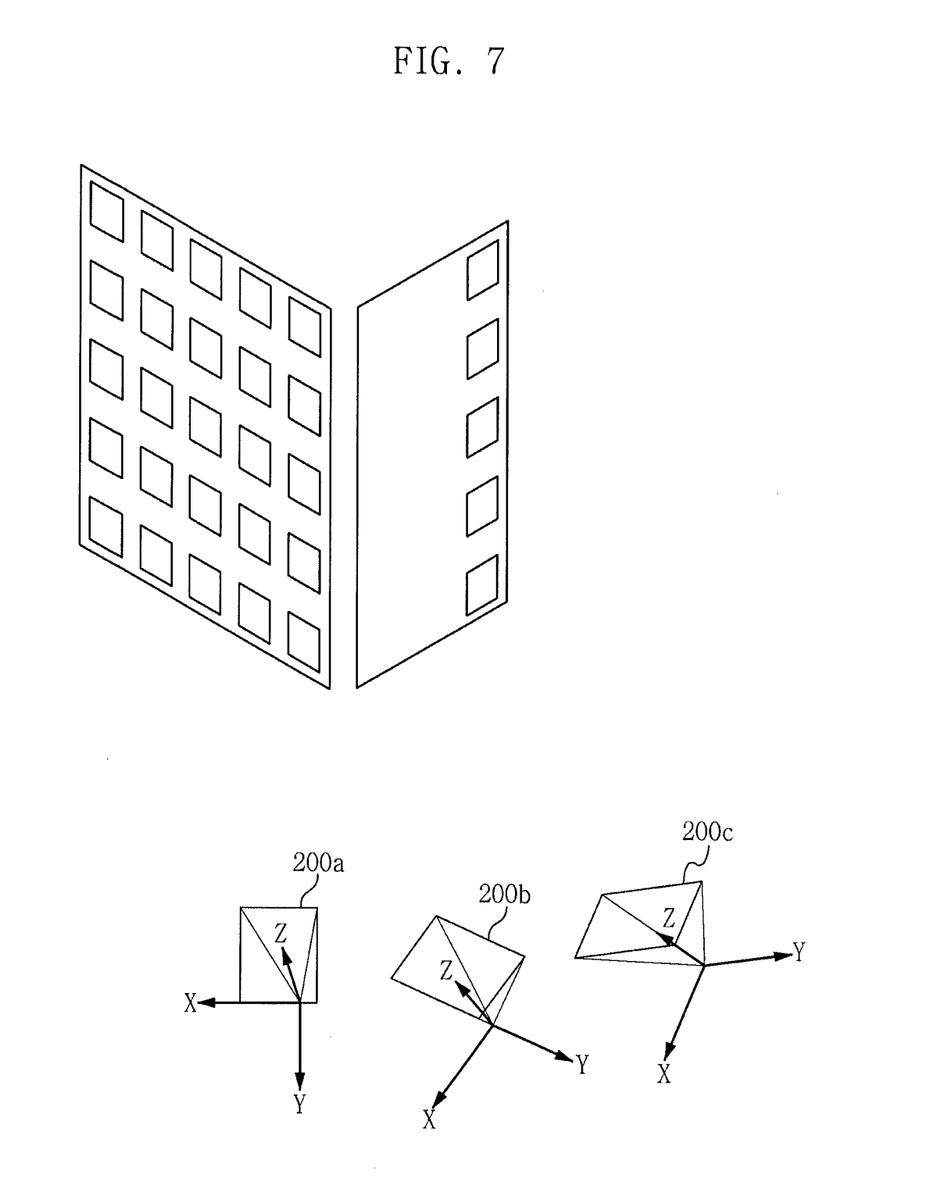
FIG. 7 is a view illustrating an example in which camera calibration is performed by calculating internal variables using the camera calibration apparatus shown in FIG. 1 so that the locations of the cameras and a building are restored using a camera calibration result, the example corresponding to a result viewed from front.

The present invention will be described in detail with reference to the accompanying drawings below. Here, when repeated description and detailed descriptions of well-known functions or configurations may make unnecessarily obscure the gist of the present invention, the detailed descriptions will be omitted. The embodiments of the present invention are provided to further completely explain to those skilled in the art the present invention. Therefore, the shapes and sizes of components in the drawings may be exaggerated for further exact description. FIG. 1 is a view schematically illustrating a camera calibration apparatus according to an embodiment of the present invention. FIG. 2 is a view schematically illustrating the camera calibration unit of the camera calibration apparatus shown in FIG. 1. FIGS. 3 to 5 are views illustrating images captured by cameras placed at locations which are different from each other. FIG. 6 is a view illustrating an example in which camera calibration is performed by calculating internal variables using the camera calibration apparatus shown in FIG. 1 so that the locations of the cameras and a building are restored using a camera calibration result, the example corresponding to a result viewed from above. FIG. 7 is a view illustrating an example in which camera calibration is performed by calculating internal variables using the camera calibration apparatus shown in FIG. 1 so that the locations of the cameras and a building are restored using a camera calibration result, the example corresponding to a result viewed from front.

As shown in FIG. 1, a camera calibration apparatus 100 according to an embodiment of the present invention receives images, in which the same background is captured, from m cameras (not shown) placed at locations which are different from each other. Further, the camera calibration apparatus 100 calculates the canonic homographies of all the parallelograms located on respective surfaces which are different from each other within each of the images. The parallelograms according to the embodiment of the present invention exist in plane spaces, which are different from each other, within an image and can be formed to have different sizes and shapes. The camera calibration apparatus 100 calculates an entire matrix for all the cameras and parallelograms using canonic homographies. The camera calibration apparatus 100 performs Singular Value Decomposition (SVD) on the entire matrix and calculates infinite homographies between the cameras at the same time. The camera calibration apparatus 100 calculates internal variables of the respective cameras using the infinite homographies, and restores the image of a building, in which one or more parallelograms exist, and the locations of the respective cameras using the calculated internal variables of the respective cameras.

Such a camera calibration apparatus 100 includes an image reception unit 110 and a camera calibration unit 120.

The image reception unit 110 receives images IM1 to IM3, in which the same background is captured, from respective cameras 200a to 200c placed at locations which are different from each other, and transmits the images to the camera calibration unit 120.

For example, the image reception unit 110 receives images which are related to a building 300 having the same background, and which are captured using the respective cameras 200a to 200c, as shown in FIGS. 3 to 5. That is, the image reception unit 110 receives the image IM1 in which the building 300 is captured using the camera 200a. The image reception unit 110 receives the image IM2 in which the building 300 is captured using the camera 200b. The image reception unit 110 receives the image IM3 in which the building 300 is captured using the camera 200c.

The camera calibration unit 120 includes a homography generation unit 121, a matrix generation unit 122, an internal variable generation unit 123 and an image restoration unit 124, as shown in FIG. 2.

The homography generation unit 121 receives the images IM1 to IM3 captured by the respective cameras 200a to 200c. The homography generation unit 121 detects the vertexes of at least two parallelograms projected onto the building 300 of each of the images IM1 to IM3. That is, the homography generation unit 121 detects the vertexes of each of the parallelograms a11 and b11 projected onto the building 300 of the image IM1. The homography generation unit 121 detects the vertexes of each of the parallelograms a12 and b12 projected onto the building 300 of the image IM2. The homography generation unit 121 detects the vertexes of each of the parallelograms a13 and b13 projected onto the building 300 of the image IM3.

The homography generation unit 121 calculates each 3×3 matrix homography, that is, a canonic homography, in such a way that each of the detected vertexes correspond to each of the vertexes (−1,−1), (−1,1), (1,−1), and (1,1) of a canonic square, and transmits the calculated matrix homography to the matrix generation unit 122.

For example, when the camera 200a is the i-th camera of the m cameras, and the parallelogram a11 projected onto the building 300 of the image IM1 is a j-th parallelogram, the homography generation unit 121 calculates a canonic homography $\tilde{H}_i^j$ corresponding to the combination of i-th camera and the j-th parallelogram, and transmits the canonic homography $\tilde{H}_i^j$ to the matrix generation unit 122.

The matrix generation unit 122 receives the canonic homography from the homography generation unit 121. Thereafter, the matrix generation unit 122 performs combination on the canonic homographies and calculates a relative homography.

In particular, the matrix generation unit 122 arbitrarily sets a reference camera k and a reference parallelogram. Here, the matrix generation unit 122 calculates a relative homography corresponding to the combination of the i-th camera and the j-th parallelogram using the reference camera k and the reference parallelogram. Here, the relative homography is expressed as Equation 1.

$$\tilde{B}_{ik}^{jl} = \tilde{H}_k^j (\tilde{H}_i^j)^{-1} \tilde{H}_i^l (\tilde{H}_k^l)^{-1} \tag{1}$$

Further, the matrix generation unit 122 calculates the eigenvalue of the relative homography, and calculates a size adjustment parameter $p_{ik}^{jl}$ used to adjust the relative size of each of canonic homographies. The matrix generation unit 122 multiplies the size adjustment parameter $p_{ik}^{jl}$ and each of the canonic homographies, and separates 3×2 portion from the resulting multiplication, thereby calculating a sub matrix $\overline{H}_i^j$ used to form an entire matrix. Further, the matrix generation unit 122 calculates an entire matrix $\overline{W}$ using the sub matrix $\overline{H}_i^j$ when there are m cameras and n parallelograms. Here, the entire matrix $\overline{W}$ is expressed as Equation 2. The matrix generation unit 122 transmits the entire matrix $\overline{W}$ to the internal variable generation unit 123.

$$\overline{W} = \begin{bmatrix} p_{1k}^{1l} \overline{H}_1^1 & \cdots & p_{1k}^{nl} \overline{H}_1^n \\ \vdots & \ddots & \vdots \\ p_{mk}^{1l} \overline{H}_m^1 & \cdots & p_{mk}^{nl} \overline{H}_m^n \end{bmatrix} \tag{2}$$

The internal variable generation unit 123 receives the entire matrix $\overline{W}$. Further, the internal variable generation unit 123 performs SVD on the entire matrix $\overline{W}$, the result thereof is expressed as Equation 3.

$$\overline{W} = U_{3m \times 3n} D_{3n \times 3n} V_{2n \times 3n}^T \tag{3}$$

Further, the internal variable generation unit 123 sets a resulting matrix such that first three columns of $U_{3m \times 3n}$ are included in the result on which the SVD was performed, detects m decomposition matrixes $\hat{U}_i$ in such a way as to decompose the resulting matrix into 3×3 portions in sequence starting from the top thereof, and then calculates infinite homographies between cameras at the same time using the decomposition matrixes $\hat{U}_i$.

For example, when an infinite homography between an i-th camera and a j-th camera should be calculated, the internal variable generation unit 123 calculates the infinite homography $H_{ij}^\infty$ between two cameras using m matrixes $\hat{U}_i$. Here, the infinite homography $H_{ij}^\infty$ is expressed as Equation 4.

$$H_{ij}^\infty = (\hat{U}_j)(\hat{U}_i) \tag{4}$$

When it is assumed that optical elements were not adjusted when each of the images was captured, the internal variable generation unit 123 calculates the internal variables of the respective cameras using an algorithm which expresses the relationship between the infinite homography $H_{ij}^\infty$ and the internal variable of each of the cameras, thereby performing camera calibration. The internal variable generation unit 123 transmits the results of camera calibration to the image restoration unit 124.

The image restoration unit 124 restores the structure of the building 300 and the locations of the respective cameras using the results of camera calibration (hereinafter referred to as "camera calibration result"), and an example of the camera calibration result is shown in FIGS. 6 and 7.

Figure 8:
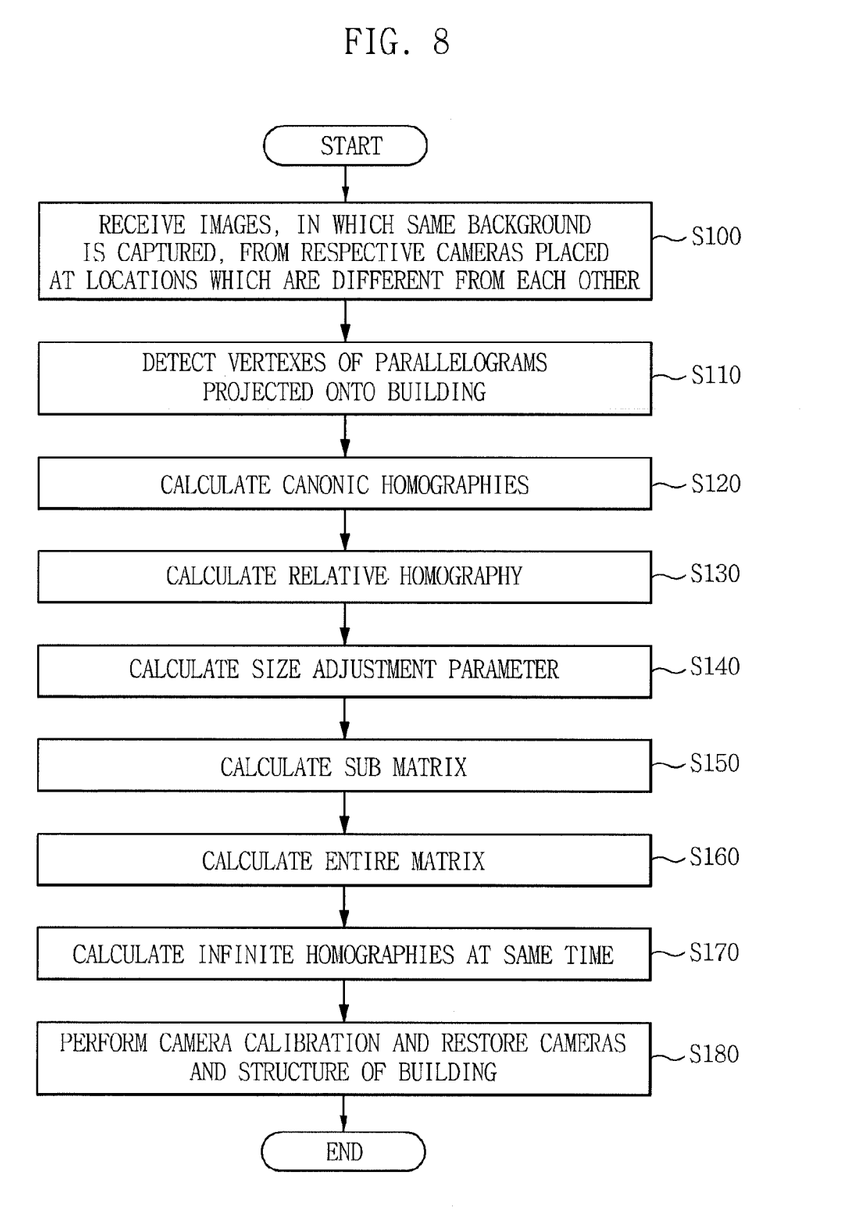
FIG. 8 is a flowchart illustrating the order of camera calibration using the camera calibration apparatus shown in FIG. 1.

FIG. 8 is a flowchart illustrating the order in which the camera calibration apparatus shown in FIG. 1 performs camera calibration.

As shown in FIG. 8, the image reception unit 110 of the camera calibration apparatus 100 according to the embodiment of the present invention receives images IM1 to IM3, in which the same background is captured, from the respective cameras placed at locations which are different from each other at step S100. The image reception unit 110 transmits the images IM1 to IM3 to the camera calibration unit 120.

The camera calibration unit 120 detects the vertexes of parallelograms projected onto the building 300 from the background of each of the images IM1 to IM3 at step S110. The camera calibration unit 120 calculates canonic homographies in such a way that the detected vertexes correspond to the vertexes of a canonic square at step S120.

The camera calibration unit 120 calculates a relative homography (refer to Equation 1) related to the combination of the i-th camera and the j-th parallelogram using the set reference camera and reference parallelogram at step S130. Further, the camera calibration unit 120 calculates a size adjustment parameter $p_{ik}^{jl}$ used to adjust the relative size for each of the canonic homographies using the relative homography at step S140. The camera calibration unit 120 calculates the sub matrix $\overline{H}_i^j$ using the size adjustment parameter $p_{ik}^{jl}$ and the canonic homography at step S150. The camera calibration unit 120 calculates an entire matrix $\overline{W}$ (refer to Equation 2) using the sub matrix $\overline{H}_i^j$ when there are m cameras and n parallelograms at step S160.

The camera calibration unit 120 performs SVD on the entire matrix $\overline{W}$, and calculates all the infinite homography information (refer to Equation 4) using the combination of two cameras at the same time at step S170.

The camera calibration unit 120 calculates the internal variables of the respective cameras using the infinite homographies, performs camera calibration, and restores the locations of the cameras and the structure of the building 300 of the background using the results of the camera calibration at step S180.

As described above, the camera calibration apparatus according to the present invention receives images, in which the same background is captured, from cameras placed at locations which are different from each other, calculates an entire matrix using at least two parallelograms located on respective surfaces which are different from each other within each of the images, and calculates infinite homographies at the same time using the entire matrix, thereby solving the problem in that infinite homographies are separately calculated, and improving accuracy by maintaining consistency.

According to the embodiments of the present invention, images, in which the same background is captured, are received from cameras placed at locations which are different from each other according to the embodiment of the present invention. An entire matrix is calculated using at least two parallelograms which do not exist on the same 3D space of each of the images, and infinite homographies are calculated at the same time using the entire matrix, thereby solving problem of separately calculating the infinite homographies and improving accuracy by maintaining consistency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A camera calibration apparatus, comprising:
   an image reception unit for receiving images, in which a same background is captured, from respective cameras placed at locations which are different from each other;
   a camera calibration unit for calculating an entire matrix using canonic homographies for all parallelograms located on respective surfaces which are different from each other within each of the images, and calculating infinite homographies between the cameras using the entire matrix at a same time; and
   a matrix generation unit for calculating sub matrixes in such a way to multiply size adjustment parameters by each of the corresponding canonic homographies.

2. The camera calibration apparatus as set forth in claim 1, wherein the matrix generation unit calculates size adjustment parameters for the respective canonic homographies using the eigenvalue of the relative homography, and calculates sub matrixes in such a way to multiply each of the size adjustment parameters by each of the corresponding canonic homographies.

3. The camera calibration apparatus as set forth in claim 2, wherein the matrix generation unit calculates the entire matrix using the size adjustment parameter corresponding to each of the sub matrixes.

4. The camera calibration apparatus as set forth in claim 1, wherein the camera calibration unit comprises an internal variable generation unit for detecting decomposition matrixes corresponding to a number of the cameras from among resulting matrixes in which Singular Value Decomposition (SVD) is performed on the entire matrix, and for calculating the infinite homographies at the same time using the decomposition matrixes.

5. A camera calibration method, comprising:
   receiving images, in which a same background is captured, from respective cameras placed at locations which are different from each other;
   calculating canonic homographies for all parallelograms located on respective surfaces which are different from each other within each of the images;
   calculating an entire matrix using the canonic homographies; and
   calculating infinite homographies between the cameras using the entire matrix, wherein the calculating the entire matrix comprises calculating sub matrixes in such a way to multiply size adjustment parameters by each of the corresponding canonic homographies.

6. The camera calibration method as set forth in claim 5, wherein the calculating the entire matrix further comprises:
   calculating a relative homography in such a way as to combine the canonic homographies;
   calculating size adjustment parameters for the respective canonic homographies using an eigenvalue of the relative homography;
   calculating sub matrixes in such a way to multiply each of the size adjustment parameters by each of the corresponding canonic homographies; and
   calculating the entire matrix using the sub matrixes and the size adjustment parameters.

7. The camera calibration method as set forth in claim 5, wherein the calculating the infinite homographies at the same time comprises:
   detecting decomposition matrixes corresponding to a number of the cameras from among resulting matrixes in which Singular Value Decomposition (SVD) is performed on the entire matrix; and
   calculating the infinite homographies at the same time using the decomposition matrixes.

* * * * *